United States Patent
Esale et al.

(10) Patent No.: US 10,291,522 B1
(45) Date of Patent: *May 14, 2019

(54) APPLICATIONS-AWARE TARGETED LDP SESSIONS

(71) Applicant: Juniper Networks, Inc., Sunnyvale, CA (US)

(72) Inventors: Santosh Esale, Sunnyvale, CA (US); Manish Gupta, Santa Clara, CA (US); Raveendra Torvi, Nashua, NH (US); Christopher Bowers, Austin, TX (US)

(73) Assignee: Juniper Networks, Inc., Sunnyvale, CA (US)

( * ) Notice: Subject to any disclaimer, the term of this patent is extended or adjusted under 35 U.S.C. 154(b) by 80 days.

This patent is subject to a terminal disclaimer.

(21) Appl. No.: 15/463,106

(22) Filed: Mar. 20, 2017

Related U.S. Application Data

(63) Continuation of application No. 14/320,242, filed on Jun. 30, 2014, now Pat. No. 9,602,354.

(51) Int. Cl.
*H04L 12/741* (2013.01)
*H04L 29/08* (2006.01)

(52) U.S. Cl.
CPC ............. *H04L 45/74* (2013.01); *H04L 67/14* (2013.01)

(58) Field of Classification Search
CPC ... H04L 45/507; H04L 41/0668; H04L 45/20; H04L 45/22; H04L 45/28; H04L 45/50; H04L 41/0893; H04L 41/24
See application file for complete search history.

(56) References Cited

U.S. PATENT DOCUMENTS

| 7,184,437 | B1 | 2/2007 | Cole et al. |
| 8,339,959 | B1 | 12/2012 | Moisand et al. |
| 8,422,514 | B1 * | 4/2013 | Kothari ............... H04L 12/4633 370/351 |
| 9,602,354 | B1 | 3/2017 | Esale et al. |
| 2006/0062218 | A1 * | 3/2006 | Sasagawa ............... H04L 45/04 370/389 |
| 2008/0002637 | A1 | 1/2008 | Oswal et al. |

(Continued)

OTHER PUBLICATIONS

Rosen, "Multiprotocol Label Switching Architecture," Network Working Group, RFC 3031, Jan. 2001, 61 pp.

(Continued)

*Primary Examiner* — Kan Yuen
(74) *Attorney, Agent, or Firm* — Shumaker & Sieffert, P.A.

(57) ABSTRACT

In general, the disclosure relates to techniques for initiating a targeted LDP session in a manner that includes information specifying one or more application for which a targeted LDP session is being initiated. In one example, a method includes receiving, by a network device, a LDP initialization message to initiate an Label Distribution Protocol (LDP) session with a peer network device, the LDP initialization message including a Targeted Applications Capability (TAC) field specifying one or more applications for which the LDP session is to be used for advertising forwarding equivalence class (FEC)-label bindings between the network device and the peer network device, and determining, by the network device, whether to allow the LDP session to be established based on the one or more applications specified in the TAC field.

19 Claims, 4 Drawing Sheets

(56) References Cited

U.S. PATENT DOCUMENTS

2012/0033664 A1\* 2/2012 Pignataro ............... H04L 45/02
370/389

OTHER PUBLICATIONS

Andersson, "LDP Specification," Network Working Group, RFC 5036, Oct. 2007, 135 pp.
Aggarwal, "MPLS Upstream Label Assignment and Context-Specific Label Space," Network Working Group, RFC 5331, Aug. 2008, 13 pp.
Rosen et al., "Provisioning, Auto-Discovery, and Signaling in Layer 2 Virtual Private Networks (L2VPNs)," IETF, RFC 6074, Jan. 2011, 32 pp.
Thomas et al., "LDP Capabilities," Network Working Group, RFC 5561, Jul. 2009, 12 pp.
Martini et al., "Pseudowire Setup and Maintenance Using the Label Distribution Protocol (LDP)," Network Working Group, RFC 4447, Apr. 2006, 66 pp.
Bryant et al., "Remote LFA FRR," draft-ieff-rtgwg-remote-lfa-02, Network Working Group, Internet-Draft, May 23, 2013, 30 pp.
Raza et al., "Disabling IPoMPLS and P2P PW LDP Application's State Advertisement," draft-ieff-mpls-ldp-ip-pw-capability-06.txt, MPLS Working Group, Jun. 20, 2013, 13 pp.
Prosecution History from U.S. Pat. No. 9,602,354, dated from Feb. 12, 2016 through Nov. 23, 2016, 44 pp.

\* cited by examiner

APPLICATIONS-AWARE TARGETED LDP SESSIONS

This application is a continuation of U.S. application Ser. No. 14/320,242 filed Jun. 30, 2014, the entire content of which is hereby incorporated by reference.

TECHNICAL FIELD

The disclosure relates to computer networks and, more particularly, to forwarding network traffic within computer networks.

BACKGROUND

Routing devices within a network, often referred to as routers, maintain routing information that describe available routes through the network. Upon receiving an incoming packet, the routers examine information within the packet and forward the packet in accordance with the routing information. In order to maintain an accurate representation of the network, routers exchange routing information in accordance with one or more defined routing protocols, such as the Border Gateway Protocol (BGP).

Multi-protocol Label Switching (MPLS) is a mechanism used to engineer traffic patterns within Internet Protocol (IP) networks. By using MPLS, a source device can request a path through a network, i.e., a Label Switched Path (LSP). An LSP defines a distinct path through the network to carry MPLS packets from the source device to a destination device. A short label associated with a particular LSP is affixed to packets that travel through the network via the LSP. Routers along the path cooperatively perform MPLS operations to forward the MPLS packets along the established path. LSPs may be used for a variety of traffic engineering purposes including bandwidth management and quality of service (QoS). A packet may be a formatted set of data.

A variety of protocols exist for establishing LSPs. For example, one such protocol is the label distribution protocol (LDP). Another such protocol is the Resource Reservation Protocol with Traffic Engineering extensions (RSVP-TE). RSVP-TE uses constraint information, such as bandwidth availability, to compute paths and establish LSPs along the paths within a network. RSVP-TE may use bandwidth availability information accumulated by a link-state interior routing protocol, such as the Intermediate System—Intermediate System (ISIS) protocol or the Open Shortest Path First (OSPF) protocol.

Head-end routers of an LSP are commonly known as ingress routers, while routers at the tail-end of the LSP are commonly known as egress routers. Ingress and egress routers, as well as intermediate routers along the LSP that support MPLS, are referred to generally as label switching routers (LSRs). A set of packets to be forwarded along the LSP is referred to as a forwarding equivalence class (FEC). In general, each router along the LSP maintains a context that associates a FEC with an incoming label and an outgoing label. This association is referred to as a FEC-label binding. The ingress label edge router (LER) uses routing information, propagated from the egress LER, to determine the LSP, to assign labels for the LSP, and to affix a label to each packet of the FEC. The LSRs use MPLS protocols to receive MPLS label mappings from downstream LSRs and to advertise MPLS label mappings to upstream LSRs. When an LSR receives an MPLS packet from an upstream router, the LSR performs a lookup in the context and swaps the MPLS label according to the information in its forwarding table based on the lookup and forwards the packet to the appropriate downstream LSR or LER. The egress LER removes the label from the packet and forwards the packet to its destination in accordance with non-label based packet forwarding techniques.

The LSRs may use LDP to distribute labels to other routers along hop-by-hop paths to establish LSPs. More specifically, the routers may distribute LDP label mapping messages indicating assigned labels and associated FECs for the LSPs. Two routers that use LDP to exchange label mapping information are referred to as LDP peer routers. Directly connected neighbor routers may be LDP peer routers with a direct LDP session. In the case where non-neighbor routers want to be LDP peer routers, the non-neighbor routers may establish a targeted LDP session between them. More information on LDP and targeted LDP sessions is described in Anderson, L., "LDP Specification," RFC 5036, October 2007, the entire contents of which are incorporated by reference herein. More information on MPLS is described in Rosen, E., "Multiprotocol Label Switching Architecture," RFC 3031, January 2001, the entire contents of which are incorporated by reference herein.

SUMMARY

In general, the disclosure relates to techniques for initiating a targeted LDP session in a manner that includes information specifying one or more application for which a targeted LDP session is being initiated. LSRs may establish targeted LDP sessions in order to exchange information used by specific applications for forwarding network communications. The "applications," as the term is used herein, refer to the various purposes for establishing the targeted LDP sessions. The LSRs may advertise particular types of FEC-label bindings associated with the applications, and the FEC-label bindings are then used in forwarding network communications. For example, a sender LSR can send an LDP initialization message that includes a new type-length-value (TLV), referred to as a Targeted Application Capability (TAC) TLV that specifies one or more applications for which a targeted LDP session is proposed to be established.

The LSR that receives the LDP initialization message (the receiver LSR) can determine whether to allow the targeted LDP session to be established based on the application information specified in the TAC TLV. Enabling LSRs to advertise Targeted Application Capability during session initialization can provide the receiver LSR with information about the targeted applications so the receiver LSR can control the acceptance of this session. If the receiver LSR determines that the initiated targeted LDP session is acceptable, the receiver LSR can reply with an LDP initialization message specifying one or more applications for which the receiver LSR is willing to establish the targeted LDP session. In this manner, the sending and receiver LSR peers can, during the LDP session initialization process, negotiate a set of Targeted Application Elements indicating a set of one or more applications for which both LSRs are willing to advertise state information over the resulting LDP session.

The techniques of this disclosure may provide one or more advantages. For example, the new Targeted Application Capability described herein allows the receiver LSR to become aware of targeted LDP application. This can be useful particularly in some targeted LDP applications, such as Remote Loop-Free Alternate (LFA) and BGP auto discovery FEC 129 pseudowire, which may automatically establish a targeted LDP session to any LSR in the core network. In automatic session establishment, the sender LSR has information about the targeted applications to administratively control initiation of the session, but the receiver LSR would typically not have this information in normal operation. Because the receiver LSR is aware of targeted LDP applications for proposed LDP sessions, the receiver LSR may apply policies to establish a limited number of sessions for certain applications, and reject LDP sessions that would exceed configured limits for the application. In addition, the techniques of this disclosure can allow the receiver LSR to map each specified targeted application to LDP FEC Elements so the LSRs can advertise only necessary LDP FEC label bindings over the session, avoiding advertising unneeded FEC-label bindings over the session and reducing resources required by unnecessary advertisement.

In one aspect, a method includes receiving, by a network device, a Label Distribution Protocol (LDP) initialization message to initiate a targeted LDP session with a peer network device, the LDP initialization message including a Targeted Applications Capability (TAC) field specifying one or more applications for which the targeted LDP session is to be used for advertising forwarding equivalence class (FEC)-label bindings between the network device and the peer network device, and determining, by the network device, whether to allow the targeted LDP session to be established based on the one or more applications specified in the TAC field.

In another aspect, a network device includes a physical interface configured to receive a Label Distribution Protocol (LDP) initialization message to initiate a targeted LDP session with a peer network device, the LDP initialization message including a Targeted Applications Capability (TAC) field specifying one or more applications for which the targeted LDP session is to be used for advertising forwarding equivalence class (FEC)-label bindings between the network device and the peer network device, and a TAC module configured to determine whether to allow the targeted LDP session to be established based on the one or more applications specified in the TAC field.

In another aspect, a computer-readable storage medium includes instructions for causing a programmable processor of a network device to receive a Label Distribution Protocol (LDP) initialization message to initiate a targeted LDP session with a peer network device, the LDP initialization message including a Targeted Applications Capability (TAC) field specifying one or more applications for which the targeted LDP session is to be used for advertising forwarding equivalence class (FEC)-label bindings between the network device and the peer network device, and determine whether to allow the targeted LDP session to be established based on the one or more applications specified in the TAC field.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
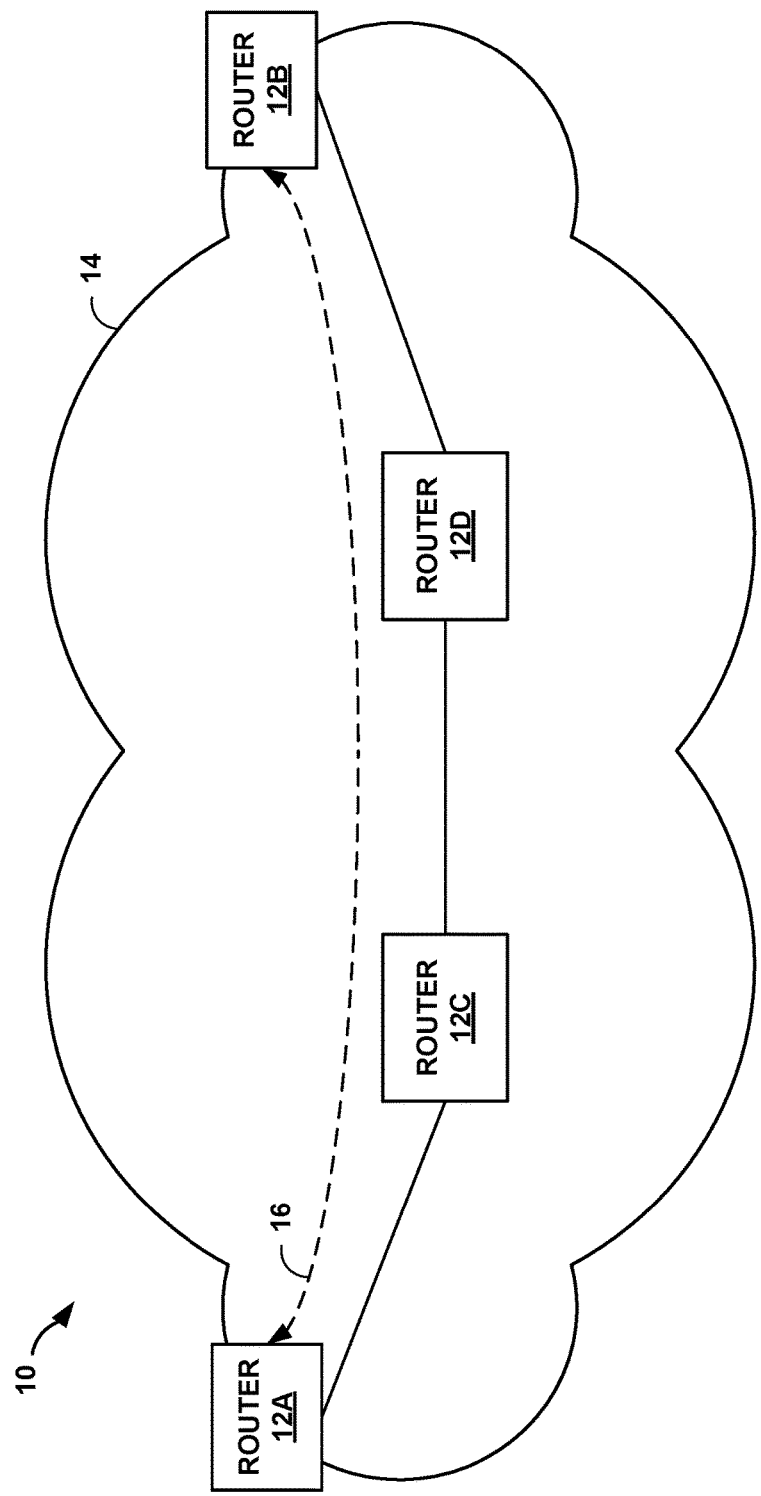
FIG. 1 is a block diagram illustrating an example network system in accordance with techniques described herein.

FIG. 1 is a block diagram illustrating an example network system 10 in accordance with techniques described herein. Network system 10 that includes a network 14 and network devices configured to employ the techniques described herein advertising a Targeted Application Capability, such as label switching routers (LSRs) 12A-12D (collectively "LSRs 12"). Network 14 may include additional network devices (not shown), such as other routers, switches, hubs, and other network devices. Routers 12A and 12B may be edge routers (e.g., provider edge routers) coupled to one or more customer networks (not shown)

In some examples, network 14 may be a service provider network. Network 14 may comprise an Internet Protocol (IP) network that uses Multi-Protocol Label Switching (MPLS) mechanisms to encapsulate packets of various network protocols for transport across network 10. MPLS protocols, such as the Label Distribution Protocol (LDP) or the Resource Reservation Protocol with Traffic Engineering extensions (RSVP-TE), enable routers to establish specific paths through network 10, i.e., Label Switched Paths (LSPs). A set of packets to be forwarded in a same manner along a same LSP is referred to as a forwarding equivalence class (FEC). Using MPLS mechanisms, data packets are assigned labels to identify the FEC to which the packets belong, and forwarding decisions are made for the data packets based on the labels. The labels are included in MPLS headers used to encapsulate the packets for transport along the LSP. In some examples, the labels are "stacked" to establish segmented LSP tunnels in which multiple LSPs are nested together in order to reach an egress router of the last LSP on the label stack. Label assignment in the MPLS architecture is described in more detail in Aggarwal, R., "MPLS Upstream Label Assignment and Context-Specific Label Space," RFC 5331, August 2008, the entire contents of which are incorporated by reference herein.

Routers 12 can use an Interior Gateway Protocol (IGP) to calculate a hop-by-hop IGP path through network 14, such as from router 12A to a remote router 12B for forwarding network traffic from router 12A to router 12B. In network 14, network devices may use the Label Distribution Protocol (LDP) to distribute labels to other routers along the hop-by-hop Interior Gateway Protocol (IGP) paths to establish LSPs. More specifically, the routers may distribute LDP label mapping messages indicating assigned labels and associated FECs for the LSPs. Two routers that use LDP to exchange label mapping information are referred to as LDP peer routers. Neighbor routers that are directly connected at the link layer may be LDP peer routers with a direct LDP session. In the case where non-neighbor routers (i.e., routers that are not directly connected at the link level but which are reachable at the network level) want to be LDP peer routers, such as LSRS 12A and 12B, the non-neighbor routers may use the LDP extended discovery mechanism and establish a targeted LDP session 16.

In the example of FIG. 1, LSRs 12 in network 14 can use the extended discovery mechanism of LDP to establish a targeted adjacency and subsequent targeted LDP session. An LSR, such as sender LSR 12A, initiates extended discovery by sending a targeted Hello message to a specific address, e.g., to the address of receiver LSR 12B to establish a targeted adjacency. After establishing the targeted adjacency, LSR 12A may distribute a LDP initialization message to LSR 12B along an IGP primary path to initiate establishment of a targeted LDP session 16 between LSR 12A and LSR 12B, for example. In the absence of the techniques of this disclosure, the remote receiver LSR 12B can decide either to accept or ignore the LDP initialization message based on local configuration only. For applications that make use of targeted LDP sessions, such as FEC 128 pseudowire and LDP over RSVP tunneling, for example, the remote LSR is configured with the source LSR address. The remote LSR 12B can use that local configuration information to accept or ignore any given LDP initialization message. FEC 128 is used for manually configuring pseudowires for Virtual Private LAN Service (VPLS).

In other examples, LSRs 12 using applications that make use of targeted LDP sessions such as remote LFA and FEC 129 pseudowires can also automatically initiate asymmetric extended discovery to any LSR in the network based on local state. In these applications, the remote LSR 12B is typically not explicitly configured with the source LSR address, so in the absence of the techniques of this disclosure the remote LSR 12B either responds to all LDP requests or ignores all LDP requests. FEC 129 is used for VPLS auto-discovery, for a PE router to automatically discover which other PE routers are members of the same VPLS domain. PWid FEC element (FEC 128) and Generalized ID FEC element (FEC 129) with Border Gateway Protocol (BGP) provisioning and auto-discovery are described in further detail in E. Rosen, "Provisioning, Auto-Discovery, and Signaling, in Layer 2 Virtual Private Networks (L2VPNs)," IETF RFC 6074, January 2011, the entire contents of which are incorporated by reference herein.

LSRs 12 may establish targeted LDP sessions, such as targeted LDP session 16, to be used for specific applications. Because the targeted LDP session is initiated and established after the targeted adjacency is formed, in the absence of the techniques of the disclosure the receiver LSR 12B has no targeted application information from which to choose the targeted applications the receiver LSR would like to support. Typically at the time of session establishment, the receiver LSR 12B does not know what application the request is for, because this information is not included in the conventional LDP initialization message. While the sender LSR 12A may employ a limit per application on locally initiated automatic targeted sessions, in the absence of the techniques of the disclosure, the receiver LSR 12B has no mechanism to apply a similar limit on the incoming targeted sessions. Also, the receiver LSR 12B does not know whether the source LSR 12A is establishing the session for a configured or an automatic application. Establishing an unbounded number of targeted LDP sessions may make receiver LSR 12B busy processing a large number of control packets, and receiver LSR 12B may be faced with memory shortage.

This disclosure describes techniques for advertising a targeted application capability, such as consisting of a targeted application list, for example, during initialization of a targeted LDP session 16. The targeted application list is a list of targeted LDP session applications for which the advertising router is capable to advertise FEC-label binding state over the targeted LDP session to be established. LSRs 12A and 12B may advertise, over the established LDP session 16, particular types of FEC-label bindings associated with the application(s), and the FEC-label bindings are then used in forwarding network communications.

For example, a sender LSR 12A can send an LDP initialization message that includes a new type-length-value (TLV), referred to as a Targeted Application Capability (TAC) TLV that specifies one or more applications for which a targeted LDP session is proposed to be established. The LSR that receives the LDP initialization message (the receiver LSR, e.g., LSR 12B) can determine whether to allow the targeted LDP session to be established based on the application information specified in the TAC TLV. Enabling LSRs 12 to advertise Targeted Application Capability during session initialization can provide the receiver LSR 12B with information about the targeted applications so the receiver LSR 12B can control the acceptance of this session. For example, receiver LSR 12B can establish a limited number of targeted LDP sessions for certain applications, and can reject the rest of requested targeted LDP sessions based on local administrative policy.

If the receiver LSR 12B determines that the initiated targeted LDP session is acceptable, the receiver LSR 12B can reply with an LDP initialization message specifying one or more applications for which the receiver LSR 12B is willing to establish the targeted LDP session 16. In this manner, the sending and receiver LSR peers can, during the LDP session initialization process, negotiate a set of Targeted Application Elements indicating a set of one or more applications for which both LSRs are willing to advertise state information over the resulting targeted LDP session 16.

In some examples, one or more of LSRs 12 may advertise that it is capable of negotiating a targeted application list over a session by using a Capability Advertisement. Capability advertisements are described in B, Thomas, "LDP Capabilities," Network Working Group Request for Comments (RFC) 5561, July 2009, the entire contents of which are incorporated by reference herein.

The techniques of this disclosure also define a mechanism to enable a new application and disable an old application after LSRs 12A, 12B establish the targeted LDP session 16. The capability information included in the Targeted Application Capability element provides the remote LSR 12B with the necessary information to control the targeted sessions on a per application basis. For instance, LSR 12B may be configured to accept all FEC 129 targeted sessions but may be configured to only accept limited number of Remote LFA targeted sessions. The new capability information in the LDP initialization message allows receiver LSR 12B to accept or deny a targeted session on an informed basis, based on the targeted application list included in the targeted capability information.

In addition, the Targeted Application Capability described herein allows LSRs 12 to map the targeted applications to LDP FEC type to advertise specific application FECs only, avoiding the advertisement of unnecessary FECs over targeted LDP session 16. This can allow LSRs 12 to avoid using resources to advertise and store state relating to the unnecessary FECs.

Figure 2:
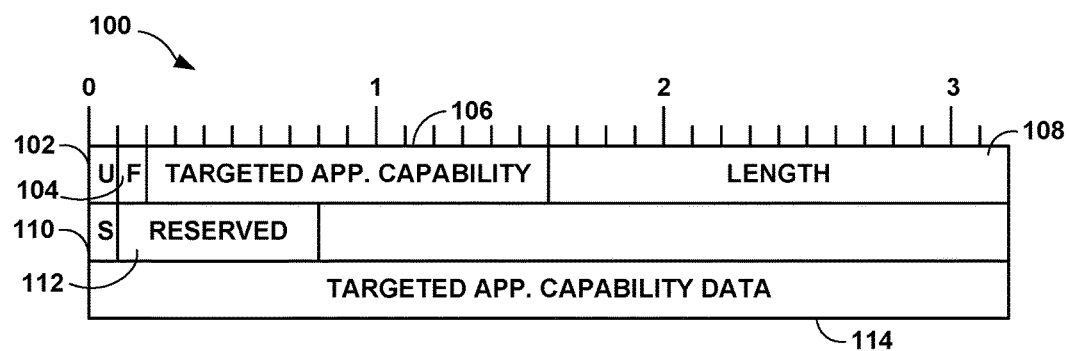
FIG. 2 is a block diagram illustrating an example Targeted Application Capability (TAC) type-length-value (TLV) used to indicate whether a network device supports negotiating a targeted application list over a session.

FIG. 2 is a block diagram illustrating an example Targeted Application Capability (TAC) type-length-value (TLV) 100 used to indicate whether a router supports negotiating a targeted application list over a session. In accordance with the techniques of this disclosure, a new optional capability TLV is defined, referred to herein as a Targeted Application Capability (TAC), which may be included in the Capability Advertisements sent by the LSR. The TAC TLV 100 is encoded as follows. TAC TLV 100 includes a "U" field 102 that is set to 1, which specifies "Ignore, if not known" to the receiver LSR. TAC TLV 100 includes an "F" field 104 that is set to 0, which specifies "Do not forward" to the receiver LSR. TAC TLV 100 also includes an "S" field 110, which is set to 1 and ignored by the receiver LSR on receipt. TAC TLV 100 includes a targeted applications capability field ("targeted app. capability") 106 that specifies that this TLV is a TAC TLV, and a length field 108 indicating the length of the TAC TLV. Reserved field 112 is reserved. TAC TLV 100 also includes Targeted Application Capability data field 114, which consists of none, one or more Targeted Application Elements, as described in further detail in FIG. 3.

Figure 3:
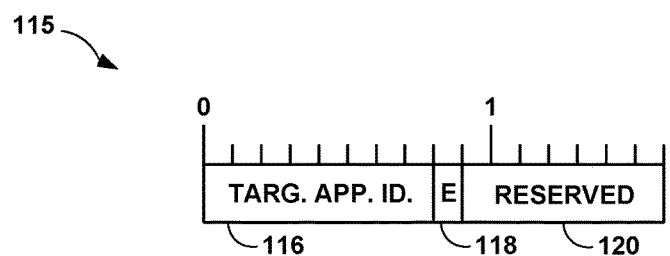
FIG. 3 is a block diagram illustrating in further detail an example Targeted Application Element that may be included in the TAC TLV of FIG. 2.

FIG. 3 is a block diagram illustrating in further detail an example Targeted Application Element 115, one or more of which may be included in Targeted Application Capability data field 114 in the TAC TLV of FIG. 2. The encoding of the Targeted Application Element 115 is as follows. The Targeted Application Element 115 includes a Targeted Application Identifier (TA-Id) field 116, which may include an identifier that specifies one or more applications for which the LDP session being initialized will be used. Example identifiers are as follows:

0x0001: LDPv4 Tunneling
0x0002: LDPv6 Tunneling
0x0003: mLDP Tunneling
0x0004: LDPv4 Remote LFA
0x0005: LDPv6 Remote LFA
0x0006: FEC 128 Pseudowire
0x0007: FEC 129 Pseudowire E-bit field 118 indicates whether the sender is advertising or withdrawing the Targeted Application. The value of E-bit field 118 is used as follows:

1—The TAE is advertising the targeted application.
0—The TAE is withdrawing the targeted application.

Reserved field 120 is reserved. The length of TAC depends on the number of Targeted Application Element (TAE) elements. For instance, if two TAE elements are added, the length is set to 5. If both the peers advertise TAC, an LSR decides to establish or close a targeted session based on the negotiated targeted application element list.

Figure 4:
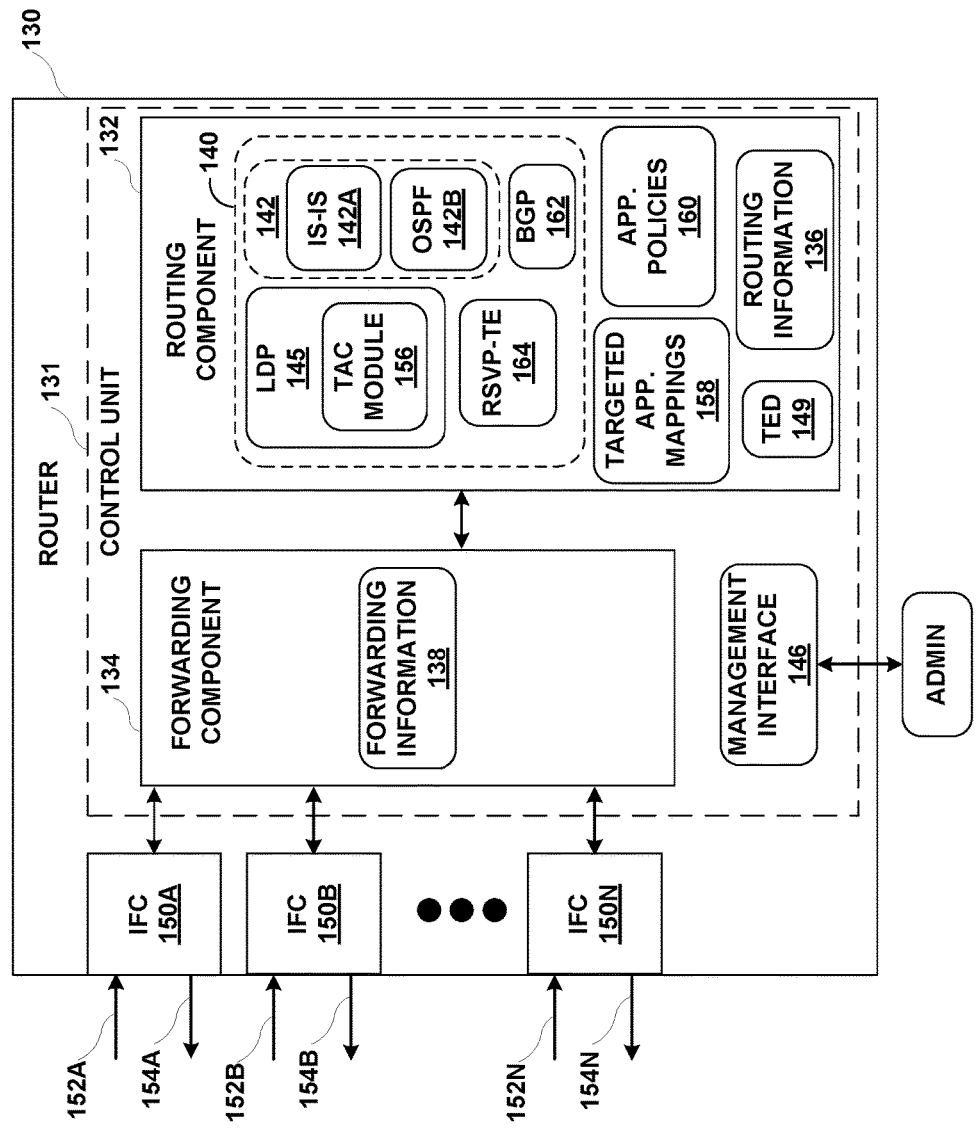
FIG. 4 is a block diagram illustrating an example router configured to operate in accordance with the techniques of this disclosure.

FIG. 4 is a block diagram illustrating an example an example router 130 configured to operate in accordance with the techniques of this disclosure. Router 130 may, for example, represent any of routers 12 of FIG. 1. Router 130 is configured with the Targeted Application Capability described herein. In this example, router 130 includes a control unit 131 that comprises a routing component 132 and a forwarding component 134. In addition, router 130 includes a set of interface cards (IFCs) 150A-150N (collectively, "IFCs 150") having physical interfaces for communicating packets via inbound links 152A-152N (collectively, "inbound links 152") and outbound links 154A-154N (collectively, "outbound links 154").

Routing component 132 primarily provides an operating environment for control plane protocols 140. For example, one or more IGP routing protocols 42, such as Intermediate System to Intermediate System (ISIS) routing protocol 42A, or the Open Shortest Path First (OSPF) routing protocol 42B, maintain routing information 36 to reflect the current topology of a network and other network entities to which router 130 is connected. In particular, IGPs 42 update routing information 36 to accurately reflect the topology of the network and other entities. Router 130 may include other example routing protocols such as Border Gateway Protocol (BGP) 164.

Routing component 132 generates and programs forwarding component 134 with forwarding information 138 that associates network destinations with specific next hops and corresponding interfaces ports of IFCs 50 in accordance with routing information 36. Routing component 132 may generate forwarding information 138 in the form of a radix tree having leaf nodes that represent destinations within the network, for example.

Based on forwarding information 138, forwarding component 134 forwards packets received from inbound links 152 to outbound links 154 that correspond to next hops associated with destinations of the packets. U.S. Pat. No. 7,184,437 provides details on an example embodiment of a router that utilizes a radix tree for route resolution. The entire contents of U.S. Pat. No. 7,184,437 are incorporated herein by reference.

In one example, forwarding component 134 is a rich and dynamic shared forwarding plane, optionally distributed over a multi-chassis router. Moreover, forwarding component 134 may be provided by dedicated forwarding integrated circuits normally associated with high-end routing components of a network router. Further details of one example embodiment of router 130 can be found in U.S. Pat. No. 8,339,959, issued Dec. 25, 2012, entitled "STREAMLINED PACKET FORWARDING USING DYNAMIC FILTERS FOR ROUTING AND SECURITY IN A SHARED FORWARDING PLANE," the entire contents of which are incorporated herein by reference.

An administrator may provide provisioning or configuration information to router 130, such as via management interface 146, for example. For example, an administrator may configure application policies ("app. policies") 160 via management interface 146. In some examples, application policies 160 may specify the types of applications that are supported by router 130. In some examples, application policies 160 may include configured limits on numbers of targeted LDP sessions to be established for particular application types. The limits may be set to avoid router 130 from getting overloaded by processing control state for many targeted LDP sessions.

As shown in FIG. 4, protocols 140 executing within routing component 132 includes one or more MPLS protocols for establishing a LSP, such as RSVP-TE 164 and LDP 145, and traffic engineering data which may be accumulated by IGPs 142. For example, RSVP-TE 164 may generate and maintain a traffic engineering database 149, including bandwidth reservations for paths associated with MPLS LSPs. RSVP-TE 164 may compute a shortest path or paths for an MPLS LSP based on specified constraints and bandwidth availability information associated with the links within the network. IGPs 142 may, in turn, advertise the calculated bandwidth availability information in traffic engineering database (TED) 149 to other peer routers.

One or more of IGPs 142 can calculate a hop-by-hop IGP path through a network, such as network 14, from router 130 to a remote router to which router 130 will establish a targeted LDP session. After calculating the IGP path to the remote router the IGP 142 may provide the address of the remote router and or information about the IGP path to LDP module 145 for establishment of the targeted LDP session. For example, in some examples, LDP module 145 may determine that sender LSR 12A needs to form an automatic targeted session to receiver LSR 12B as the remote PQ node based on data received from at least one of IGPs 142.

Border Gateway Protocol (BGP) module 162 is a routing protocol module that advertises routing information to BGP peers via BGP route advertisements. In some examples, BGP module 162 performs auto-discovery for FEC 129 pseudowires. LDP module 145 can use auto-discovery information provided by BGP module 162 to set up targeted LDP sessions over which to signal pseudowires.

LDP module 145 includes a Targeted Application Capability (TAC) module 156 that operates to include the Targeted Application capability in LDP messages. In some examples, TAC module 156 may include a TAC in LDP Initialization messages. When using a TAC in a LDP Initialization message: 1. The S-bit of the Targeted Application Capability parameter is set to 1 to advertise Targeted Application Capability and should be ignored on the receipt. The E-bit of the Targeted Application Element is set to 1 to enable Targeted application. 2. LDP module 145 may add State Control Capability by mapping Targeted Application element to State Advertisement Control (SAC) Elements as indicated above. 3. LDP module 145 may add a different Hold time value for an automatic targeted session.

In some examples, TAC module 156 may include a TAC in LDP Capability messages. When using a TAC in a LDP Capability message: 1. The S-bit of Targeted Application Capability is set to 1 and ignored on receipt. 2. If there is no common Targeted Application element between its new TAC and the peer's TAC, LDP module 145 sends a 'Session Rejected/Targeted Application Capability Mis-Match 'Notification message and close the session. 3. If there is a common Targeted Application Element, LDP module 145 may also update State Advertisement Control (SAC) Capability as described in further detail below and send these capabilities in a Capability message to the peer. 4. A receiver LSR processes the Capability message and its Targeted Applications Capability TLV. The S-bit is ignored on receipt. 5. Process a List of Targeted Application Elements from capability data with E-bit set to 1 to construct peer's Targeted Application Capability.

Thus, TAC module 156 can send a message including the TAC either at session initialization, or later after the session is already established. For example, router 130 could advertise the remote LFA targeted application in the initialization message, and later withdraw the remote LFA targeted application in a dynamic capability message, then advertise the remote LFA targeted application again later in with another dynamic capability message.

TAC module 156 can use the targeted application lists to determine which types of FEC-label bindings are to be advertised on the targeted LDP session being established. That is, only FEC-label bindings of types corresponding to the types of applications on the negotiated targeted application list are allowed to be advertised on the targeted LDP session. TAC module 156 compares the TAE elements included in its generated TAC TLV to the TAE elements included in the received TAC TLV, and determines whether there is a set of common TAE elements. TAC module 156 can store state in targeted application mappings ("targeted app. mappings") 158 that indicates which applications were negotiated for each targeted LDP session that LDP module 145 has established. TAC module 156 can also maintain a mapping of targeted applications to LDP FEC types, in targeted application mappings 158. TAC module 156 can use targeted application mappings 158 to avoiding the advertisement of unnecessary FECs over the LDP sessions.

If the Targeted Application Capability and Dynamic Capability are negotiated during session Initialization, TAC module 156 may re-negotiate the TAC after session establishment by sending the updated TAC TLV in LDP Capability message. Dynamic Capability is defined in RFC 5561, referenced above. The Updated TLV will consist of one or more TAE elements with E bit set or E bit off to advertise or withdraw one or more applications. This may lead to advertisements or withdrawals of certain FEC types over the session or destruction of the adjacency and subsequently the session.

The techniques of this disclosure also address the interaction of Targeted Application Capabilities and State Advertisement Control Capabilities. As described herein, the set of Targeted Application Elements negotiated between two LDP peers advertising TAC represents the willingness of both peers to advertise state information for a set of applications. The set of applications negotiated by the TAC mechanism is symmetric between the two LDP peers. In the absence of further mechanisms, two LDP peers will both advertise state information for the same set of applications.

As described in K. Raza, "Disabling IPoMPLS and P2P PW LDP Application's State Advertisement," MPLS Working Group Internet Draft, Jun. 20, 2013, the entire contents of which are incorporated by reference herein, a State Advertisement Control (SAC) TLV can be used by an LDP speaker to communicate its interest or disinterest in receiving state information from a given peer for a particular application, referred to herein as "the SAC mechanism." Two LDP peers can use the SAC mechanism to create asymmetric advertisement of state information between the two peers for any particular application.

For a given LDP session, the TAC mechanism described herein can be used without the SAC mechanism, and the SAC mechanism can be used without the TAC mechanism. It is useful to discuss the behavior when TAC and SAC mechanisms are used on the same LDP session. In accordance with the techniques of this disclosure, the TAC mechanism may take precedence over the SAC mechanism with respect to enabling applications for which state information will be advertised. For an LDP session using the TAC mechanism, for example, the LDP peers would not advertise state information for an application that has not been negotiated in the most recent Targeted Application Elements list (referred to as an un-negotiated application). This is true even if one of the peers announces its interest in receiving state information that corresponds to the un-negotiated application by sending a SAC TLV. In other words, when TAC is being used, SAC cannot enable state information advertisement for applications that have not been enabled by TAC.

On the other hand, in some examples the SAC mechanism takes precedence over the TAC mechanism with respect to disabling state information advertisements, according to the techniques of this disclosure. If an LDP speaker has announced its disinterest in receiving state information for a given application to a given peer using the SAC mechanism, its peer would not send state information for that application, even if the two peers have negotiated that the corresponding application via the TAC mechanism.

For the purposes of determining the correspondence between targeted applications defined herein and application state as defined K. Raza, "Disabling IPoMPLS and P2P PW LDP Application's State Advertisement," MPLS Working Group Internet Draft, Jun. 20, 2013, an LSR may use the following mappings:

LDPv4 Tunneling—IPv4 Label switching
LDPv6 Tunneling—IPv6 Label switching
LDPv4 Remote LFA—IPv4 Label switching
LDPv6 Remote LFA—IPv6 Label switching FEC 128 Pseudowire—P2P PW FEC128 signaling
FEC 129 Pseudowire—P2P PW FEC129 signaling An LSR MAY map Targeted Application to LDP capability as follows:

mLDP Tunneling—P2MP Capability, MP2MP Capability.

Figure 5:
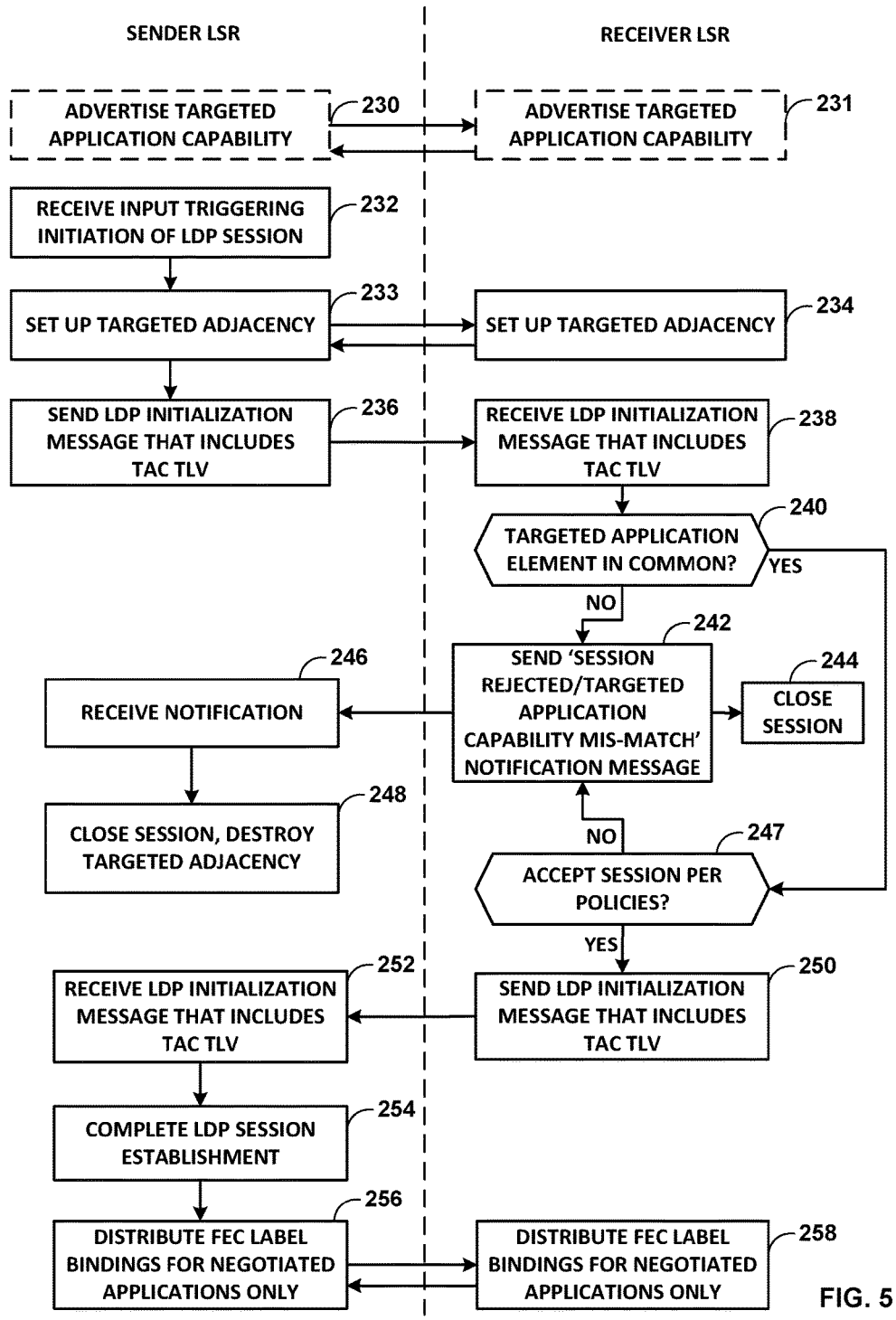
FIG. 5 is a flowchart illustrating an example mode of operation of one or more network devices in a network in using the techniques described herein.

FIG. 5 is a flowchart illustrating an example mode of operation of one or more network devices in a network in using the techniques described herein. FIG. 5 is described in the context of a sender LSR and a receiver LSR, which may be LSR 12A and LSR 12B, for example. For purposes of example, FIG. 5 will be described with reference to FIGS. 1-4.

In the example of FIG. 5, LSR 12A as the sender LSR and LSR 12B as the receiver LSR may each advertise their respective capability of negotiating a targeted application list over a session, such as by using a Capability Advertisement (230, 231). These steps may be optional, and in other examples the sending and receiving LSRs may not advertise this capability with a Capability Advertisement, but instead may simply advertise the capability during the LDP session establishment by virtue of including the TAC TLV in the LDP initialization message.

In the example of FIG. 5, sender LSR 12A may receive some input that triggers initiation of an LDP session (232). In some examples, this input may be configuration or provisioning by an administrator on sender LSR 12A, such as via management interface 146, for example. In some examples, LDP module 145 can use auto-discovery information provided by BGP module 162 to initiate setup of targeted LDP sessions over which to signal pseudowires. In some examples, sender LSR 12A may determine that sender LSR 12A needs to form an automatic targeted session to receiver LSR 12B as the remote PQ node based on IGP calculation.

Sender LSR 12A may then initiate set up of a targeted adjacency to receiver LSR 12B (233), such as by sending a targeted Hello message to receiver LSR 12B according to the LDP specification as described in RFC 5036, referenced above. Receiver LSR 12B also participates in setting up the targeted adjacency (234).

After the targeted adjacency is established and sender LSR 12A opens a transport connection (e.g., as described in RFC 5036) for an LDP session between sender LSR 12A and receiver LSR 12B, sender LSR 12A can proceed to LDP session establishment. In some examples, sender LSR 12A may play the active role in session establishment, and receiver LSR 12B may play the passive role. After sender LSR 12A and receiver LSR 12B establish a transport connection, sender LSR 12A and receiver LSR 12B negotiate session parameters by exchanging LDP initialization messages that include a new capability TLV as an optional TLV in the LDP Initialization message, such as Targeted Application Capability (TAC) TLV 100 (FIG. 2) (236).

The TAC TLV 100 includes capability data 114 that consists of none, one or more Targeted Application Elements (TAEs) 115 each pertaining to a unique Targeted Application Identifier (TA-Id). If the receiver LSR 12B receives the same TA-Id in more than one TAE element, the receiver LSR may be configured to discard the TAC TLV and behave as if the TAC TLV is not received. If the receiver LSR 12B receives an unknown TA-Id in a TAE element, the receiver LSR 12B can, in some examples, silently ignore such a TAE element and continue processing the rest of the TLV. If receiver LSR 12B does not receive the TAC in the Initialization message or receiver LSR 12B does not understand the TAC TLV, the TAC negotiation may be considered unsuccessful, and the session establishment may proceed as per RFC 5036.

On the receipt of an LDP initialization message that includes a valid TAC TLV (238), receiver LSR 12B will generate its own TAC TLV with TAE elements consisting of unique TA-Ids that receiver LSR 12B may support over the targeted session, e.g., based on application policies 160 specifying the types of applications that are supported by receiver LSR 12B. Receiver LSR 12B then compares the TAE elements included in its generated TAC TLV to the TAE elements included in the received TAC TLV, and determines whether there is a set of common TAE elements. If there is not at least one TAE element in common between the TAC TLV the receiver LSR 12B has received and the TAC TLV generated by the receiver LSR 12B (NO branch of 240), receiver LSR 12B can send a 'Session Rejected/Targeted Application Capability Mis-Match' Notification message to the peer router (242) and close the session (244). When sender LSR 12A is playing the passive role in LDP session establishment, sender LSR 12A may destroy the corresponding targeted adjacency.

In some examples, when receiver LSR 12B playing the active role in LDP session establishment receives a 'Session Rejected/Targeted Application Capability Mis-Match' Notification message, LDP module 145 of receiver LSR 12B may set its session setup retry interval to a maximum value, as 0xffff. The session may stay in non-operational state. When receiver LSR 12B detects a change in configuration of sender LSR 12A or local configuration pertaining to TAC TLV, receiver LSR 12B will clear the session setup back off delay associated with the session to re-attempt the session establishment.

When sender LSR 12A playing the active role in LDP session establishment receives a 'Session Rejected/Targeted Application Capability Mis-Match' Notification message (246), either sender LSR 12A will set its session setup retry interval to a maximum value, as 0xffff or sender LSR 12A will destroy the corresponding targeted adjacency with the session, leading to destruction of the session (248). If sender LSR 12A sets the session setup retry interval to maximum, the session may stay in a non-operational state. When sender LSR 12A detects a change in receiver LSR 12B configuration or sender LSR 12A's own configuration pertaining to TAC TLV, sender LSR 12A will clear the session setup back off delay associated with the session to re-attempt the session establishment.

If sender LSR 12A destroys the associated targeted adjacency, the session is destroyed on sender LSR 12A as well as on receiver LSR 12B. Sender LSR 12A may take appropriate actions if sender LSR 12A is unable to bring up the targeted session. For instance, if receiver LSR 12B rejects an automatic session intended to support the Remote LFA application, LDP module 145 of sender LSR 12A may, in some examples, inform its IGP routing protocols 42 to calculate another PQ node for the route or set of routes. More specific actions are a local matter. Remote LFA is discussed in further detail S. Bryant, "Remote LFA FRR," Internet-Draft, Network Working Group, May 23, 2013, the entire contents of which are incorporated by reference herein, or some other mechanism.

If there is at least one TAE element in common between the TAC TLV the receiver LSR 12B has received and the TAC TLV generated by receiver LSR 12B (YES branch of 240), TAC module of receiver LSR 12B can determine whether to accept the LDP session based on any application policies 160 configured on receiver LSR 12B as to how many sessions per application are acceptable (247). For example, TAC module 156 may check stored state information indicating how many sessions already exist per application to determine whether allowing the proposed LDP session would exceed any configured limits on the number of sessions allowed for the types of application(s) specified in the TAC TLV of the received LDP initialization message.

If TAC module 156 determines that the proposed LDP session is not allowed based on the configured application policies 160 (NO branch of 247), LDP module 145 can send a 'Session Rejected/Targeted Application Capability Mis-Match' Notification message (246), as previously described. If TAC module 156 determines that the proposed LDP session is allowed based on the configured application policies 160 (YES branch of 247), LDP module 145 of receiver LSR 12B can send an LDP initialization message that includes the generated TAC TLV specifying the identifiers of the targeted applications (TA-ids) that receiver LSR 12B supports (250). Sender LSR 12A and receiver LSR 12B then complete LDP session establishment as per RFC 5036 (254).

In accordance with the techniques of this disclosure, after an LDP session has been established by exchanging LDP initialization messages that include the TAC capability, sender LSR 12A and receiver LSR 12B can distribute FEC-label bindings for the negotiated applications only (256, 258). For instance, if the LDP session is established for an FEC 129 pseudowire application, only FEC 129 label bindings can be distributed over the session. Similarly, a LSR can request FEC label bindings for the negotiated applications only.

Example use cases will now be described. In one example, the techniques of this disclosure may be used in the context of Remote LFA Automatic Targeted sessions. An LSR may determine that the LSR needs to form an automatic targeted session to remote PQ node based on IGP calculation, or some other mechanism. Determining the PQ node is described in further detail in the Internet-Draft entitled "Remote LFA FRR," referenced above. The LSR forms the targeted adjacency and during session setup, constructs an Initialization message with Targeted Applications Capability (TAC) with Targeted Application Element (TAE) specifying "Remote LFA" as the targeted application. The receiver LSR processes the LDP Initialization message and verifies whether the receiver LSR is configured to accept a Remote LFA targeted session. If the receiver LSR is so configured, the receiver LSR may further verify that establishing such a session does not exceed the configured limit for Remote LFA sessions. If all these conditions are met, the receiver LSR may respond back to the sender LSR with an Initialization message with TAC corresponding to Remote LFA, and subsequently the session may be established.

After the session has been established with TAC capability, the sender and receiver LSR distribute IPv4 or IPv6 FEC label bindings over the session. Further, the receiver LSR may determine that the receiver LSR does not need these FEC label bindings. So the receiver LSR may disable the receipt of these FEC label bindings by mapping targeted application element to state control capability.

In another example, the techniques of this disclosure may be used in the context of FEC 129 Auto Discovery Targeted session. For example, using BGP auto discovery or other mechanisms, an LSR may determine whether to initiate an auto-discovery targeted session with a border LSR. Multiple LSRs may try to form an auto-discovery LDP targeted session with a border LSR. So a service provider may want to limit the number of auto-discovery targeted sessions a border LSR may accept. LDP may convey Targeted Applications with TAC TLV to border LSR. A border LSR may establish or reject the session based on local administrative policy. Also, as the receiver LSR would be aware of targeted application, the receiver LSR can also employ an administrative policy for security. For instance, the receiver LSR can employ a policy 'accept all auto-discovered session from source-list'.

Moreover, in response to receiving the TAC FEC with the application list, the sender and receiver LSR will exchange FEC 129 application states only over the targeted session, i.e., FEC 129 label bindings only, without exchanging other type of FEC-label bindings over the targeted session.

In a further example, the techniques of this disclosure may be used in the context of LDP over RSVP and Remote LFA targeted session. For example, an LSR may determine that the LSR should establish a targeted session to a remote LSR for LDP over RSVP tunneling and Remote LFA. The sender LSR may add both the LDP over RSVP and Remote LFA applications as unique Targeted Application Elements in the Targeted Application Capability data of a TAC TLV. The receiver LSR may have reached a configured limit for accepting automatic targeted sessions for Remote LFA, but the receiver LSR may also be configured to accept LDP over RSVP tunneling. In this case, the targeted session is formed for both LDP over RSVP and Remote LFA applications as both needs the same FECs—IPv4 and/or IPv6. Also, in response to receiving the TAC FEC with the application list, the sender and the receiver LSR will then distribute IPv4 and or IPv6 FEC label bindings only over the session, without exchanging other type of FEC-label bindings over the targeted session.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various aspects of this disclosure have been described. These and other aspects are within the scope of the following claims.

The invention claimed is:

1. A method comprising:
receiving, by a network device, a Label Distribution Protocol (LDP) initialization message to initiate a targeted LDP session with a peer network device, the LDP initialization message including a Targeted Applications Capability (TAC) field specifying one or more applications for which the targeted LDP session is to be used for advertising forwarding equivalence class (FEC)-label bindings between the network device and the peer network device;
determining, by the network device and in response to receiving the LDP initialization message, one or more common applications among the one or more applications specified by the TAC field and one or more applications supported by the network device; and
allowing, by the network device, the targeted LDP session to be established for sending only FEC-label bindings of types corresponding to the one or more common applications.

2. The method of claim 1, further comprising:
determining one or more types of FEC-label bindings to be advertised on the targeted LDP session based on the one or more applications specified by the TAC field of the LDP initialization message; and
after establishing the targeted LDP session, advertising only the determined one or more types of FEC-label bindings on the targeted LDP session without advertising any other type of FEC-label bindings on the LDP session.

3. The method of claim 1, wherein the TAC field comprises a TAC type-length-value (TLV) that includes one or more Targeted Application Elements that each identify the one or more applications for which the peer network device will use the targeted LDP session to be used for advertising the FEC-label bindings.

4. The method of claim 3, further comprising:
by the network device and in response to receiving the LDP initialization message including the TAC TLV, generating a TAC TLV type-length-value (TLV) that includes one or more Targeted Application Elements specifying one or more applications that are supported by the network device; and
wherein determining the one or more common applications comprises determining that the TAC TLV included in the received LDP initialization message and the generated TAC TLV specify the one or more common applications.

5. The method of claim 1, further comprising determining, by the network device, whether to allow the targeted LDP session based on one or more application-related policies configured on the network device.

6. The method of claim 5, wherein the one or more application-related policies indicate whether targeted LDP sessions for one or more applications are allowed on the network device.

7. The method of claim 5, wherein the one or more application-related policies indicate a maximum number of targeted LDP sessions permitted to be established for a particular application.

8. The method of claim 7, wherein the TAC field specifies a particular application to be used over the LDP session, the method further comprising determining whether to allow the LDP session based on whether a maximum number of LDP sessions for the particular application has been reached.

9. The method of claim 1, further comprising:
in response to determining that at least one application is both supported by the network device and specified by the TAC field, sending a responsive LDP initialization message to the peer network device, wherein the responsive LDP initialization message specifies one or more applications supported by the network device.

10. The method of claim 9, wherein the responsive LDP initialization message specifies all applications supported by the network device.

11. The method of claim 1, wherein the one or more applications comprise one or more of LDP over Resource Reservation Protocol (RSVP), Remote Loop-Free Alternate (LFA), and FEC 129 Auto Discovery applications.

12. The method of claim 1, further comprising:
receiving, by the network device, an LDP Capability message including a TAC field indicating that the at least one of the one or more applications is a withdrawn application for which the peer network device will no longer advertise FEC-label bindings on the targeted LDP session;
updating stored state to indicate that the withdrawn application is withdrawn for the targeted LDP session; and
advertising FEC-label bindings associated with each of the one or more applications except for the withdrawn application.

13. A network device comprising:
a physical interface configured to receive a Label Distribution Protocol (LDP) initialization message to initiate a targeted LDP session with a peer network device, the LDP initialization message including a Targeted Applications Capability (TAC) field specifying one or more applications for which the targeted LDP session is to be used for advertising forwarding equivalence class (FEC)-label bindings between the network device and the peer network device; and
a TAC module operable by processing circuitry to, in response to receiving the LDP initialization message including the TAC field, determine one or more common applications among the one or more applications specified by the TAC field and one or more applications supported by the network device, and allow the targeted LDP session to be established for sending only FEC-label bindings of types corresponding to the one or more common applications.

14. The network device of claim 13, wherein the TAC module determines one or more types of FEC-label bindings to be advertised on the targeted LDP session based on the one or more applications specified by the TAC field of the LDP initialization message, and after establishing the targeted LDP session, advertises only the determined one or more types of FEC-label bindings on the targeted LDP session without advertising any other type of FEC-label bindings on the LDP session.

15. The network device of claim 13, wherein the TAC field comprises a TAC type-length-value (TLV) that includes one or more Targeted Application Elements that each identify the one or more applications for which the peer network device will use the targeted LDP session to be used for advertising the FEC-label bindings, wherein, in response to receiving the LDP initialization message including the TAC TLV, the TAC module generates a TAC TLV type-length-value (TLV) that includes one or more Targeted Application Elements specifying one or more applications that are supported by the network device, and determines that the TAC TLV included in the received LDP initialization message and the generated TAC TLV specify the one or more common applications.

16. The network device of claim 13, wherein the TAC module is configured to determine whether to allow the targeted LDP session based on one or more application-related policies configured on the network device.

17. The network device of claim 13, wherein the TAC module is configured to, in response to determining that at least one application is both supported by the network device and specified by the TAC field, send a responsive LDP initialization message to the peer network device, wherein the responsive LDP initialization message specifies one or more applications supported by the network device.

18. A non-transitory computer-readable storage medium comprising instructions for causing a programmable processor of a network device to:

receive a Label Distribution Protocol (LDP) initialization message to initiate a targeted LDP session with a peer network device, the LDP initialization message including a Targeted Applications Capability (TAC) field specifying one or more applications for which the targeted LDP session is to be used for advertising forwarding equivalence class (FEC)-label bindings between the network device and the peer network device;

in response to receiving the LDP initialization message including the TAC field, determine one or more common applications among the one or more applications specified by the TAC field and one or more applications supported by the network device; and allow the targeted LDP session to be established for sending only FEC-label bindings of types corresponding to the one or more common applications.

19. A method comprising:

receiving, by a network device, a Label Distribution Protocol (LDP) initialization message to initiate a targeted LDP session with a peer network device, the LDP initialization message including a Targeted Applications Capability (TAC) field specifying one or more applications for which the targeted LDP session is to be used for advertising forwarding equivalence class (FEC)-label bindings between the network device and the peer network device;

determining one or more types of FEC-label bindings to be advertised on the targeted LDP session based on the one or more applications specified by the TAC field of the LDP initialization message; and after establishing the targeted LDP session, advertising only the determined one or more types of FEC-label bindings on the targeted LDP session without advertising any other type of FEC-label bindings on the LDP session.

* * * * *